US006846037B2

(12) United States Patent
Engels et al.

(10) Patent No.: US 6,846,037 B2
(45) Date of Patent: Jan. 25, 2005

(54) REAR END MODULE FOR PASSENGER MOTOR VEHICLES

(75) Inventors: Frank Engels, Drolshagen (DE);
Friedhelm Buning, Drolshagen (DE);
Karl-Heinz Baumann, Bondorf (DE);
Klaus Rathje, Hildrizhausen (DE)

(73) Assignee: ISE Innomotive Systems Europe GmbH, Bergneustadt (DE)

( * ) Notice: Subject to any disclaimer, the term of this patent is extended or adjusted under 35 U.S.C. 154(b) by 0 days.

(21) Appl. No.: 10/433,552

(22) PCT Filed: Dec. 7, 2001

(86) PCT No.: PCT/EP01/14361

§ 371 (c)(1),
(2), (4) Date: Oct. 22, 2003

(87) PCT Pub. No.: WO02/46026

PCT Pub. Date: Jun. 13, 2002

(65) Prior Publication Data

US 2004/0066061 A1 Apr. 8, 2004

(30) Foreign Application Priority Data

Dec. 7, 2000 (DE) ......................................... 100 60 784

(51) Int. Cl.[7] .............................................. B60K 37/00
(52) U.S. Cl. ............................ 296/193.04; 296/193.08; 296/187.11; 296/203.04
(58) Field of Search ....................... 296/193.04, 193.08, 296/187.11, 203.04, 203.01, 193.03

(56) References Cited

U.S. PATENT DOCUMENTS

| | | | | |
|---|---|---|---|---|
| 4,234,225 A | * | 11/1980 | Harasaki et al. | 296/203.04 |
| 4,874,200 A | * | 10/1989 | Nasu et al. | 296/193.04 |
| 4,875,733 A | * | 10/1989 | Chado et al. | 296/203.04 |
| 4,900,083 A | * | 2/1990 | Kumasaka et al. | 296/193.04 |
| 4,914,802 A | * | 4/1990 | Takao et al. | 296/193.03 |
| 4,950,025 A | * | 8/1990 | Yoshii | 296/203.04 |
| 5,110,177 A | * | 5/1992 | Akio | 296/187.11 |
| 5,246,263 A | * | 9/1993 | Tanaka et al. | 296/187.11 |
| 5,267,772 A | * | 12/1993 | Ohta et al. | 296/187.11 |
| 5,549,352 A | * | 8/1996 | Janotik et al. | 296/203.01 |
| 5,580,121 A | * | 12/1996 | Dange et al. | 296/203.04 |
| 5,934,745 A | * | 8/1999 | Moore et al. | 296/193.04 |
| 6,237,990 B1 | * | 5/2001 | Barbier et al. | 296/187.11 |
| 6,241,309 B1 | * | 6/2001 | Roehl et al. | 296/203.04 |
| 6,276,477 B1 | * | 8/2001 | Ida | 296/193.04 |
| 6,286,896 B1 | * | 9/2001 | Eipper et al. | 296/187.03 |
| 6,443,518 B1 | * | 9/2002 | Rohl et al. | 296/203.04 |
| 6,450,567 B2 | * | 9/2002 | Toba et al. | 296/187.11 |
| 6,616,220 B2 | * | 9/2003 | Cheong | 296/203.04 |
| 6,672,639 B2 | * | 1/2004 | Kosuge et al. | 296/187.11 |
| 6,672,653 B2 | * | 1/2004 | Nishikawa et al. | 296/203.04 |
| 6,729,008 B2 | * | 5/2004 | Nishijima | 296/193.04 |
| 6,729,682 B2 | * | 5/2004 | Delavalle et al. | 296/193.08 |

FOREIGN PATENT DOCUMENTS

| | | |
|---|---|---|
| DE | 199 13 532 | 9/1999 |
| DE | 198 31 708 | 1/2000 |
| EP | 0 810 148 | 12/1997 |
| EP | 1 127 777 | 8/2001 |
| FR | 1 231 040 | 9/1960 |

* cited by examiner

*Primary Examiner*—Kiran Patel
(74) *Attorney, Agent, or Firm*—Hudak, Shunk & Farine Co. LPA

(57) ABSTRACT

The body of passenger motor vehicles comprises, among other things, two longitudinal bearers and a rear end having a rear end middle piece. In order to minimize the extent of repair of damages to the rear end, the invention provides that the rear bumper bending bearer is bolted as a lower module in the area of the rear longitudinal bearer to the body via deformation elements provided for absorbing energy. In order to minimize the complexity of repairs of damages involving a greater extent of deformation to the rear end, the invention additionally provides that the entire rear end middle piece or portions thereof is/are structured as another lower module of the rear end module that can be bolted to the body.

20 Claims, 7 Drawing Sheets

REAR END MODULE FOR PASSENGER MOTOR VEHICLES

FIELD OF THE INVENTION

The invention relates to a rear end module for passenger motor vehicles, the body of which has two longitudinal members and a rear end with a rear end middle piece, with a bumper flexural member that can be bolted to the vehicle body via deformation elements for energy absorption in the area of the rear longitudinal member.

BACKGROUND OF THE INVENTION

The cost pressures in the automotive industry in general, combined with the necessity for an economically efficient production, have given rise to considerations of a modular construction of motor vehicles. In this type of construction, certain components of a vehicle are completely assembled by suppliers to form modules which together with other modules are then assembled into a complete vehicle by the vehicle manufacturer using bolted connections, e.g. in accordance with German Laid Open Publication DE 38 09 456 A1. This manufacturing concept follows the trend of increasingly relocating assembly work to the supplier to reduce, among other things, the storage capacities required by the vehicle manufacturer. The cited publication also describes a rear end module comprising a rear end trim part, the taillight panel provided with openings for the taillight assemblies and the separately mountable bumper.

A modular construction of a vehicle is also disclosed in German Laid Open Publication DE 196 21 451 A1.

This publication describes three typical modules of a motor vehicle. The first module comprises the entire front end. The second module comprises the passenger compartment with the front and rear windshield, including two exterior rear fenders molded thereto. A third module, the rear end module, is inserted therebetween from behind and the top forming a seal when the vehicle is assembled at the vehicle manufacturer's plant. This rear end module comprises the entire trunk with the floor part and possibly a floor well for the spare wheel and, opposite the exterior fenders, sidewalls to which the taillights are mounted, and the front and rear end wall of the trunk. The rear bumper, comprising the bumper flexural member bolted to the two longitudinal members and its cover, also forms part of the rear end module.

In addition to the effect of modular construction on the economic efficiency of vehicle production, the ease with which the modules can be repaired is also important for insurance rate classification. For example, if the modules are too large, i.e. if they include too many components, the entire module must be replaced after a collision. This makes it costly to repair minor damage after an accident.

Today, the repair of vehicles with light to moderate front end collision damage is therefore substantially facilitated by relatively small front end modules in which the front end is divided into components that can be bolted together, i.e.

- a front structure comprising the headlight assemblies, the radiator, the hood lock and various other units,
- a primary structure for specific energy absorption and an outer enclosure, e.g. a bumper apron, The front structure and the outer enclosure also help absorb energy.

Because the components can be replaced by bolting them into place, costly welding and alignment work is reduced, so that insurers classify these vehicles in lower full collision rate categories.

For rear end structures, the current practice is to use only small modules for specific energy absorption. This rear end module comprises small energy-absorbing deformation elements, so-called crash boxes, which in practice are a part of the rear longitudinal member, as well as the bumper flexural member, which is typically trimmed like a bumper. This rear end module is bolted to the body in the area of the rear longitudinal member.

Such a rear end module is described, for instance, in German Laid Open Application DE 198 31 708 A1.

The invention is based on this type of rear end module.

For space reasons, the so-called rear end middle piece of the body-in-white structure and other rear end components clearly protrude over the bolting surfaces of such a rear end module in longitudinal vehicle direction and thereby prevent energy absorption solely through the crash boxes. Thus, in case of a rear impact, although the longitudinal member is kept free from damage by the boltable rear end module, the rear end middle piece itself is prematurely deformed because of its exposed position.

As a result, undesirable body damage occurs despite the boltable rear end module. This causes costly repairs and has a negative effect on the insurance classification.

SUMMARY OF THE INVENTION

The object of the invention is to configure the initially described rear end module in such a way as to ensure economically efficient repair even if the deformation depths are clearly greater than those defined by the crash boxes.

Based on a rear end module for passenger motor vehicles, the body of which has two longitudinal members and a rear end with a rear end middle piece, with a bumper flexural member, which can be bolted to the vehicle body via deformation elements for energy absorption in the area of the rear longitudinal member, this object is attained according to the invention by configuring the entire rear end middle piece or portions thereof as a submodule that can be bolted to the body.

In the rear end module according to the invention, the scope of the replaceable boltable components is thus clearly expanded by the integration of the rear end middle piece. The bolting locations of the entire rear end module relative to the body are now arranged in the area of the taillight frame, on the rear longitudinal members and in the area of the lateral parts of the rear end.

The rear end module according to the invention has the following advantages:

- Rear impacts cause damage only to boltable parts, even with clearly greater deformation depths than before.
- Insurers assign lower collision classification.
- If the body is made of steel, a different material, e.g. aluminum, can be used for the rear end module or its submodules to reduce weight.
- The module does not need to be painted in the same color as the vehicle.
- Different modules can take into account the individual body types, e.g. sedan, coupe or station wagon.

According to one embodiment of the invention, the rear end module is configured as a preassembled unit with preassembled vehicle components, such as taillight light assemblies and trunk lid lock. This embodiment enables an economically efficient assembly of the rear end section of the vehicle.

According to a further embodiment of the invention, the rear end module according to the invention is configured in such a way that the rear end middle piece submodule is combined with the bumper flexural member and deformation element submodule into a complete boltable module that can be replaced in its entirety.

In case of rear end damage, the entire boltable module can then be simply replaced.

The bumper flexural member and the deformation elements may be damaged as a result of an accident while the rear end middle piece remains intact. To prevent the total damage from becoming larger because of the complete boltable module, a further development of the invention provides that the rear end middle piece submodule and the bumper flexural member and deformation element submodule be configured as separately replaceable boltable modules.

Depending on the deformation depth, the submodules can then be replaced separately.

According to a further embodiment of the invention, the rear end module is preferably configured in such a way that the rear end middle piece submodule consists of a partial module including an outer and inner central rear end cover and a partial module including two rear end side panels each adjoining the ends of the central rear end covers. The two partial modules have extensions and perforated strips, so that the partial modules can be bolted together.

This embodiment allows cost-effective repairs because it is not necessary to replace the entire "rear end middle piece" submodule in case of rear end damage with large deformation depth. In case of a lateral rear impact it is sufficient to replace the respective rear end side panel. In case of a central rear impact, only the "rear end cover" submodule may have to be replaced.

In an advantageous structural refinement of this further development, the two rear end side panels have two sections that are angled relative to one another, a rear section and a fender-side section. The rear section is provided with a perforated strip to that it can be bolted to the rear end cover submodule. The fender-side section has a perforated strip so that it can be bolted to the respective fender.

The partial modules of the "rear end middle piece" submodule can then be interconnected in a simple manner advantageous for the body structure, before they are joined to the body as a submodule.

To configure the "rear end middle piece" submodule as a preassembled unit and to save additional body parts, this submodule is designed in such a way that the rear end side panels have openings to receive the taillight assemblies and that the inner central rear end cover has an opening for the trunk lid lock.

To prevent the rear bumper from protruding too far from the body and to make it more embedded, the rear end module is preferably configured in such a way that the outer central rear end cover has an inwardly angled section to partially accommodate the bumper flexural member and deformation element submodule and at the two ends is provided with a fastening surface to bolt it the longitudinal members.

With respect to the material, the submodules can be stampings made of sheet steel and/or aluminum for weight reasons. The material-related design may also include some submodule components that are made of plastic.

BRIEF DESCRIPTION OF THE DRAWINGS

The invention will now be described in greater detail, by way of example, with reference to an embodiment depicted in the drawings, in which.

DETAILED DESCRIPTION OF THE INVENTION

The figures of the patent drawings show various views of the rear end section of a passenger motor vehicle with a modular construction according to a preferred embodiment of the invention.

This modular construction of the rear end section, the rear end module with its submodules, has to satisfy the following requirements:

clearly reduced extent of damage in case of rear end collision reduced weight through increased use of light metal no loss of body rigidity (static or dynamic)

no loss regarding endurance strength tightness of joints simple assembly potential for simplified assembly of entire unit in production process attractive cost/benefit ratio The rear end module according to the invention satisfies all of these requirements.

Figure 6:
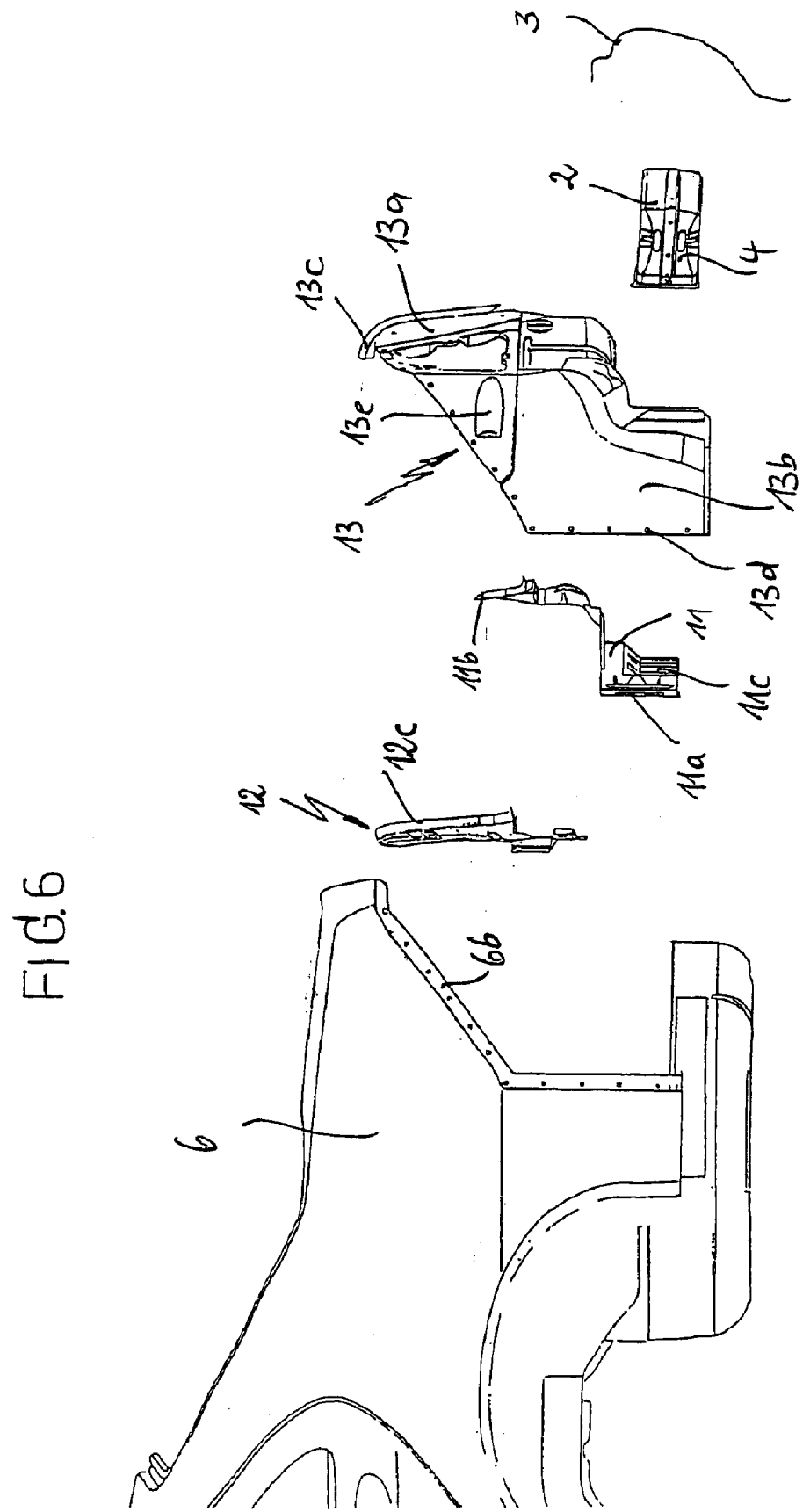
FIG. 6 is an exploded side view analogous to FIG. 2 showing the submodules and partial modules of the rear end module.
Figure 7:
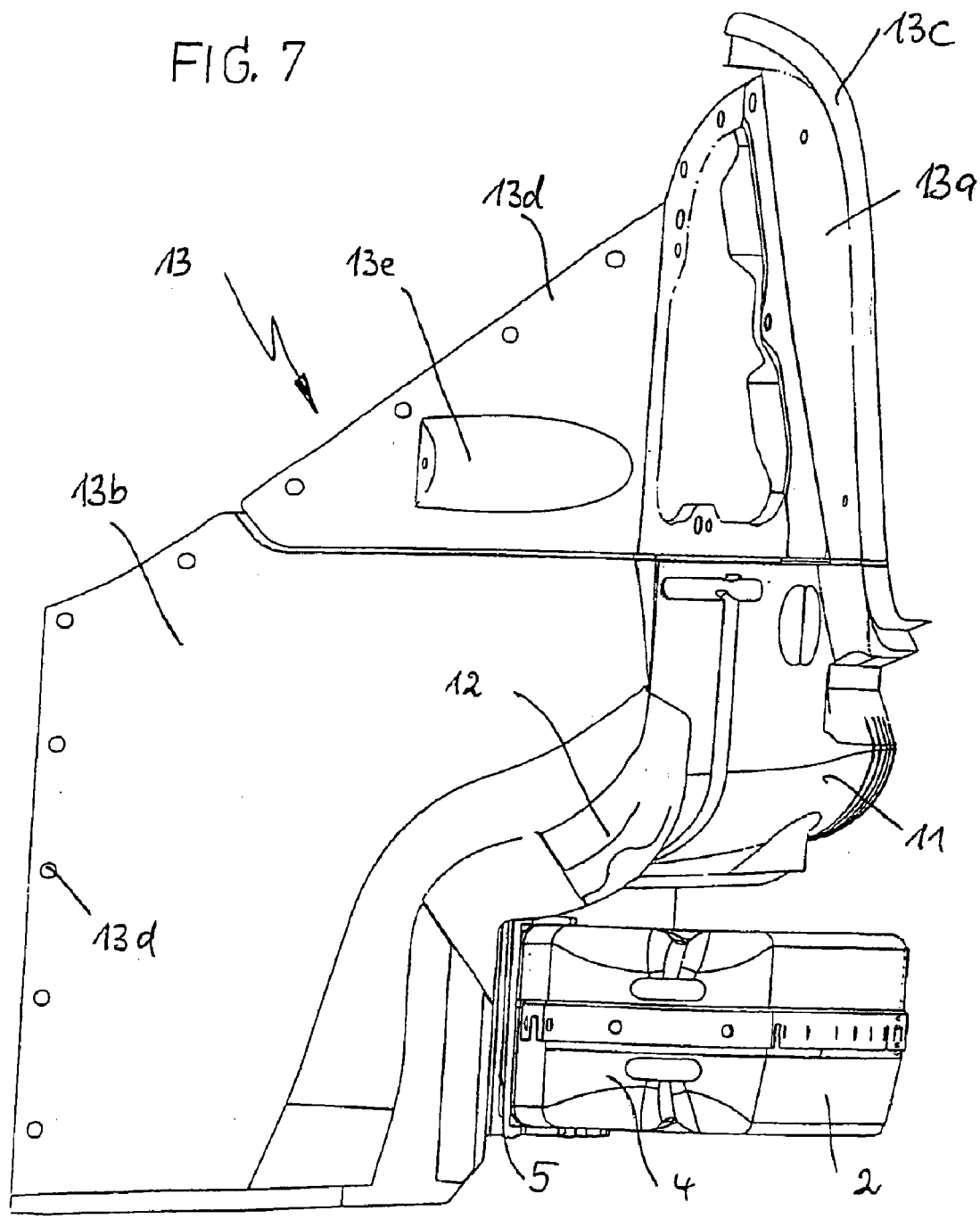
FIG. 7 is an enlarged detail of FIG. 5 depicting the finally assembled rear end module in a side view.

The embodiment of the rear end module according to the invention depicted in the figures has a submodule 1 comprising, in a manner known per se, a bumper flexural member 2, which is enclosed like a bumper by a plastic part 3 (FIG. 6) and elastically yielding deformation elements 4 mounted to the bumper flexural member 2. The deformation elements 4 are each bolted to the two longitudinal members 5 of the self-supporting body via connecting flanges. For simplicity' sake, the corresponding views show only the rear end section of the body, with the fenders 6 and the tank filler neck 6a, the trunk floor 7 with the spare tire well 7a, the rear window 8 and the trunk lid 9.

The "rear end middle piece" submodule 10 has a plurality of partial modules: the outer rear end cover 11 and the inner rear end cover 12, which are typically referred to as taillight panels, and two angled rear end side panels 13 forming integrated side cavities, with a rear section 13a and a fender-side section 13b. Among other things, these partial modules also form the rear cross member on the body-in-white side.

As the drawings generally show, parts of the body of the rear end middle piece in the rear end module according to the invention form an additional submodule, unlike in the conventional rear end module, which consists only of the submodule 1, the bumper flexural member and the crash boxes.

Figure 1:
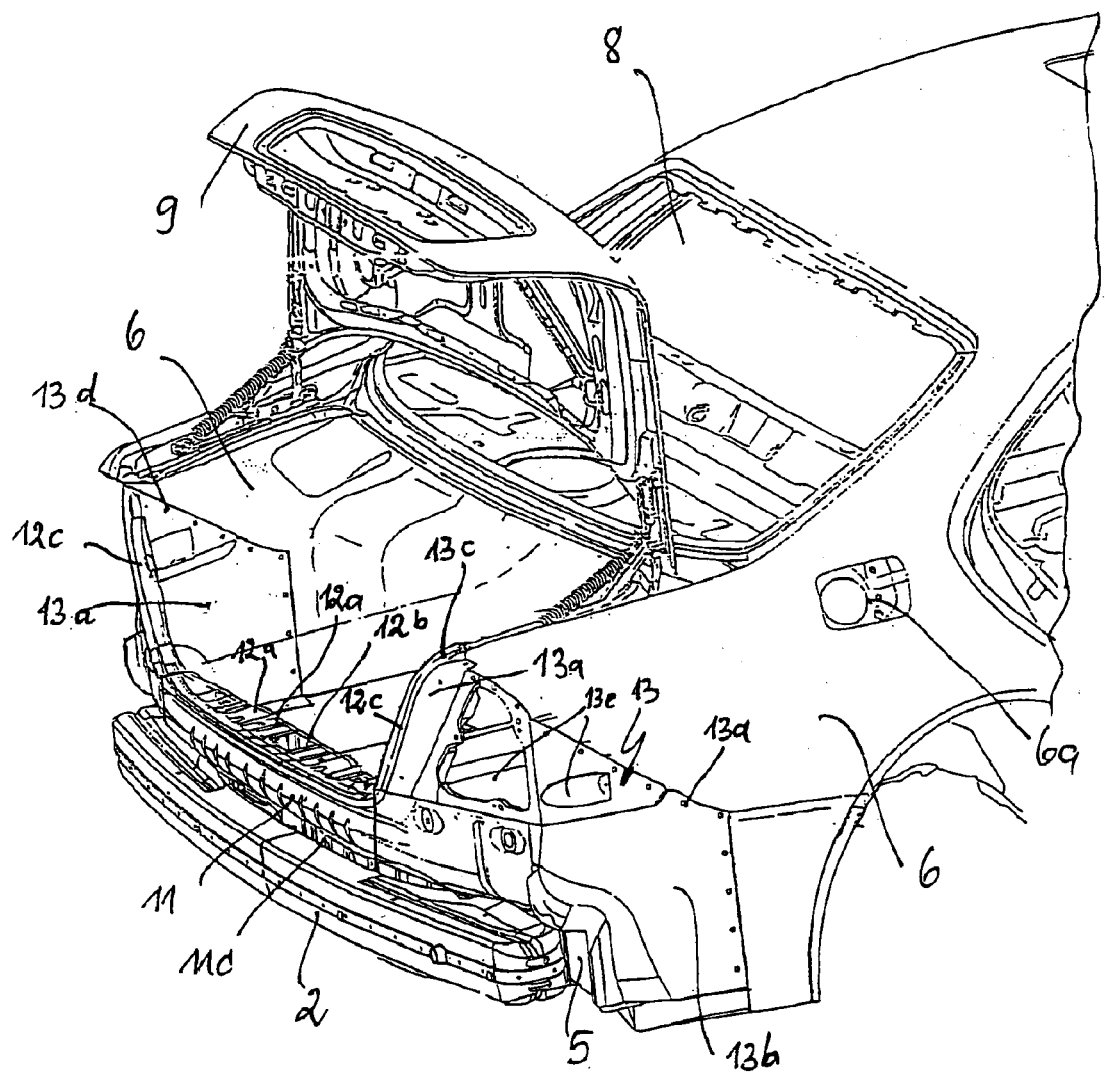
FIG. 1 is a perspective view of the rear end section of the body-in-white of a passenger car with a preferred embodiment of the rear end module according to the invention in its finally assembled state.
Figure 2:
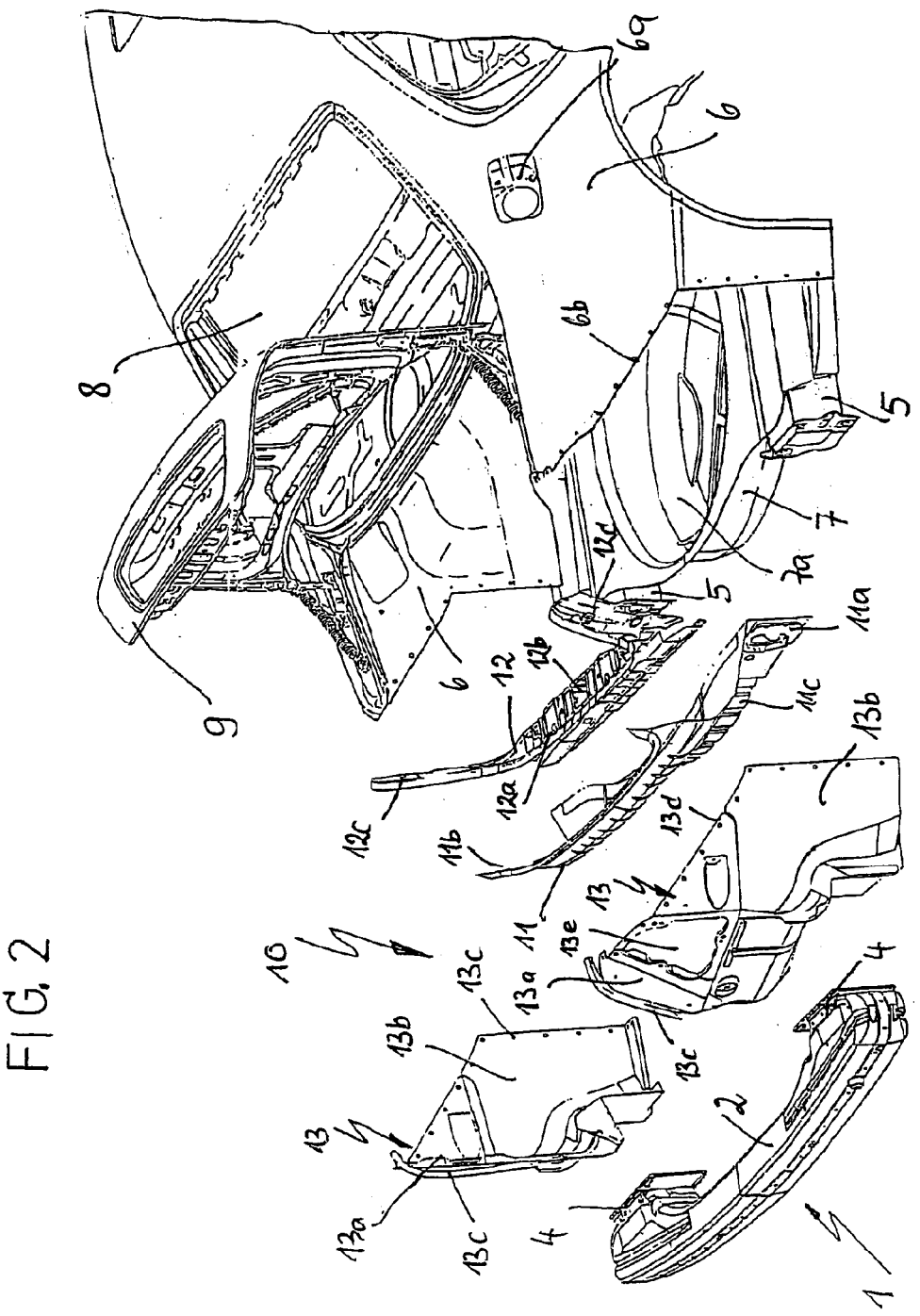
FIG. 2 is an exploded view of the submodules and partial modules of the rear end module according to FIG. 1.
Figure 3:
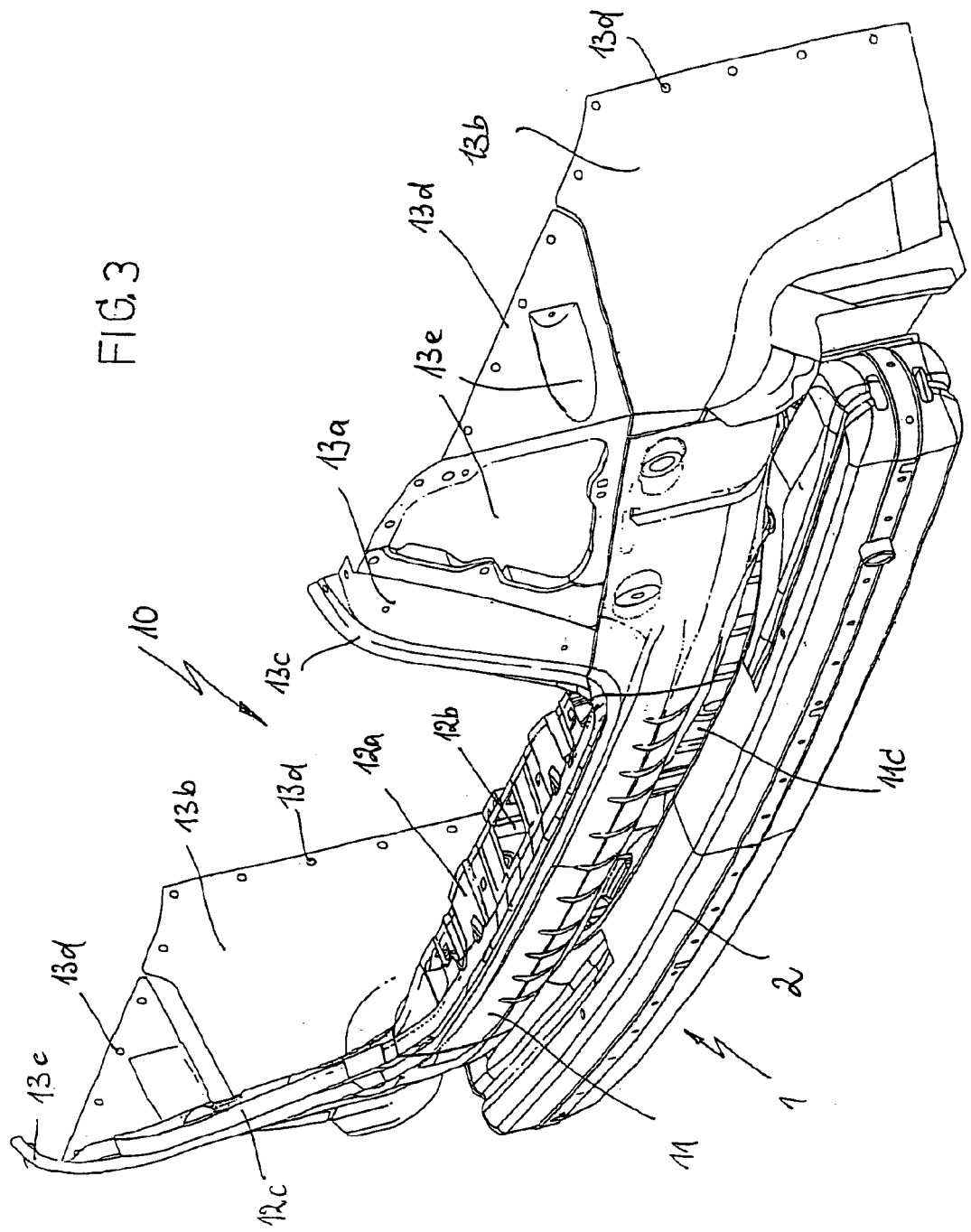
FIG. 3 is an enlarged detail of FIG. 1 illustrating the finally assembled rear end module.
Figure 4:
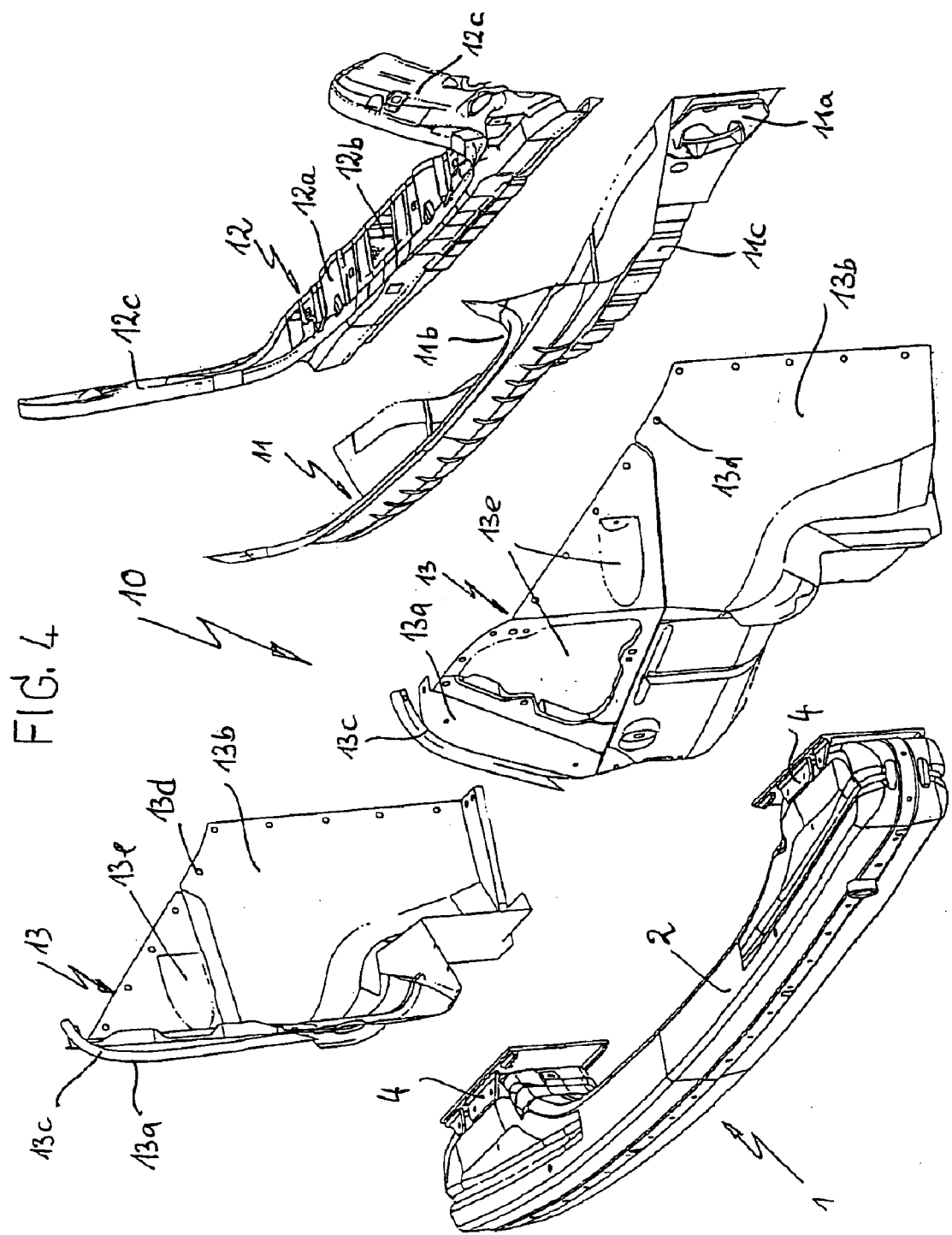
FIG. 4 is an exploded view analogous to FIG. 2 showing the submodules and partial modules of the finally assembled rear end module according to FIG. 3.
Figure 5:
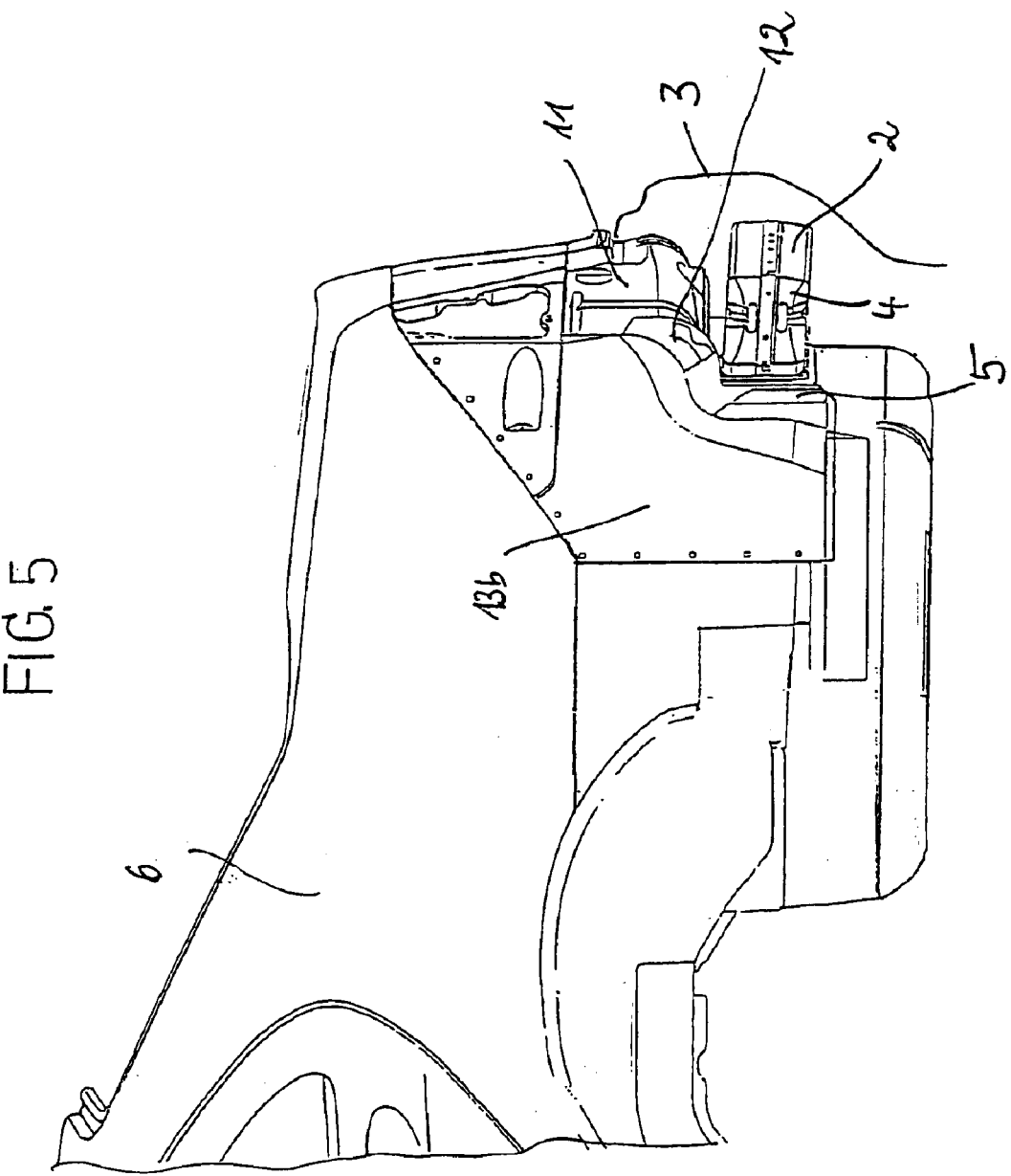
FIG. 5 is a schematic side view of the rear end section according to FIG. 1 with the finally assembled rear end module.

The apron-like angled outer rear end cover 11 has bolting surfaces 11a at both ends so that, together with the bumper module 1, it can be bolted to the longitudinal members 5. At its upper edge 11b the outer rear end cover has a groove to receive the profiled sealing member, which seals the trunk lid 9. The lower angled section 11c provides a clearance to partially receive the bumper module 1 (FIG. 3). The inner rear end cover has an upper support surface 12a that can be used when the trunk is being loaded and a recess 12b to receive the trunk lid lock. At its two ends, the inner rear end cover has upwardly protruding flange-type joining sections 12c to bolt the cover to the rear end side panels 13. The inner rear end cover further has a groove-type recess to receive the profiled sealing member for the trunk lid 9.

The two rear end covers 11, 12 are preferably stampings, i.e. taillight panels, which can be made of sheet aluminum to save weight. They are preferably mechanically joined with a boltable partial module, which can be bolted to the rear end side panels 13. If made of sheet steel, the parts can be mechanically joined by spot welding.

The two rear end side panels 13 form a further partial module of the "rear end middle piece" submodule. Each can be bolted to the rear end section 13a having a recess 13c for the profiled sealing system of the trunk edge by means of the upwardly protruding connecting sections 12c of the inner rear end cover 12. On the side section 13b the rear end side panels have joining strips 13d for bolting to the fenders, each of which has a bolting strip 6b. The rear end side panels further have openings 13c to accommodate the taillight assemblies. The rear end side panels are preferably also stampings, preferably made of sheet aluminum. However, molded plastic parts can also be used for the partial modules 11, 12 and 13.

To produce the vehicles, the partial modules 11/12 and 13 are preferably preassembled, i.e. bolted together and provided with the taillight assemblies and the trunk lock, before the entire unit, i.e. as a rear end middle piece submodule 10, is bolted to the body. It is also feasible to connect the bumper submodule 1 with the rear end middle piece module 10 to form the rear end module according to the invention, shown in its final state in FIG. 3. In case of a collision with high deformation depth, the entire rear end module according to FIG. 3 can then be replaced as a closed unit without costly welding and alignment work. It is more advantageous, however, to connect the two submodules 1 and 10 so as to be detachable in a nondestructive manner, so that in case of accidents where the rear end middle piece remains intact, only the bumper submodule 1 has to be replaced.

The depicted rear end module structure is of course only an example for a specific body type, For other body types, the structural design must be adapted to the corresponding type.

What is claimed is:

1. A rear end module for passenger motor vehicles, a body of which has two longitudinal members and a rear end comprising: a rear end middle piece to which a rear bumper flexural member can be bolted via deformation elements for energy absorption in the area of the rear longitudinal members, wherein the rear end module comprises two submodules that can be replaced by bolted assembly, a first submodule comprising the rear bumper flexural member with the deformation elements and a second submodule comprising the rear end middle piece detached from the body-in-white, with the entire rear end middle piece or parts thereof configured to be bolted to the remaining body-in-white.

2. The rear end module as claimed in claim 1, wherein the module is configured as a preassembled unit with preassembled vehicle components.

3. The rear end module as claimed in claim 2, wherein the preassembled vehicle components are the taillight assemblies and the rear lid lock.

4. The rear end module as claimed in claim 1, wherein the submodule of the rear end middle piece is combined with the submodule of the bumper flexural member and deformation elements into a complete boltable module that can be replaced as a unit.

5. The rear end module as claimed in claim 1, wherein the rear end middle piece submodule and the bumper flexural member and deformation element submodule are configured as separately replaceable boltable modules.

6. The rear end module as claimed in claims 1, the rear end middle piece submodule comprises a partial module consisting of an outer and an inner central rear end cover and a partial module consisting of two rear end side panels adjoining the two ends of the central rear end cover, wherein the two partial modules have extensions and perforated strips for bolting the partial modules together.

7. The rear end module as claimed in claim 6, wherein the two rear end side panels have two sections angled relative to one another forming integrated side cavities, a rear section and a fender-side section wherein the rear section has a perforated strip for bolting to the partial module of the rear end cover and the fender-side section has a perforated strip for bolting to the respective fender.

8. The rear end module as claimed in claim 6, wherein the rear end side panels have openings to receive the taillight assemblies.

9. The rear end module as claimed in claim 6, wherein the inner central rear end cover has a recess for the trunk lid lock.

10. The rear end module as claimed in claim 6, wherein the outer central rear end cover has an inwardly angled section for partially receiving the submodule of the bumper flexural member with deformation elements and at the two ends has a mounting surface each for bolting to the longitudinal members.

11. The rear end module as claimed in claim 1, wherein the submodules have stampings made of sheet steel or aluminum, or combinations thereof.

12. The rear end module as claimed in claim 11, wherein some components of the submodules are made of plastic.

13. The rear end module as claimed in claim 3, wherein the rear end middle piece submodule and the bumper flexural member and deformation element submodule are configured as separately replaceable boltable modules.

14. The rear end module as claimed in claim 13, wherein the rear end middle piece submodule comprises a partial module consisting of an outer and an inner central rear end cover and a partial module consisting of two rear end side panels adjoining the two ends of the central rear end cover, wherein the two partial modules have extensions and perforated strips for bolting the partial modules together.

15. The rear end module as claimed in claim 14, wherein the two rear end side panels have two sections angled relative to one another forming integrated side cavities, a rear section and a fender-side section, wherein the rear section has a perforated strip for bolting to the partial module of the rear end cover, and the fender-side section has a perforated strip for bolting to the respective fender.

16. The rear end module as claimed in claim 15, wherein the rear end side panels have openings to receive the taillight assemblies.

17. The rear end module as claimed in claim 16, wherein the inner central rear end cover has a recess for the trunk lid lock.

18. The rear end module as claimed in claim 17, wherein the outer central rear end cover has an inwardly angled section for partially receiving the submodule of the bumper flexural member with deformation elements and at the two ends has a mounting surface each for bolting to the longitudinal members.

19. The rear end module as claimed in claim 18, wherein the submodules have stampings made of sheet steel or aluminum, or combinations thereof.

20. The rear end module as claimed in claim 19, wherein some components of the submodules are made of plastic.

* * * * *

UNITED STATES PATENT AND TRADEMARK OFFICE
CERTIFICATE OF CORRECTION

PATENT NO. : 6,846,037 B2
DATED : January 25, 2005
INVENTOR(S) : Frank Engels et al.

It is certified that error appears in the above-identified patent and that said Letters Patent is hereby corrected as shown below:

Column 6,
Line 16, please replace "claims 1" with -- claim 1, wherein --.

Signed and Sealed this

Twenty-fourth Day of May, 2005

JON W. DUDAS
*Director of the United States Patent and Trademark Office*